US009314860B1

(12) United States Patent
Izworski

(10) Patent No.: US 9,314,860 B1
(45) Date of Patent: Apr. 19, 2016

(54) ELECTRICAL DISCHARGE MACHINING AUTOMATED ELECTRODE CHANGER

(71) Applicant: Johnson Technology, Inc., Muskegon, MI (US)

(72) Inventor: Mark D. Izworski, Kent City, MI (US)

(73) Assignee: Johnson Technology, Inc., Muskegon, MI (US)

( * ) Notice: Subject to any disclaimer, the term of this patent is extended or adjusted under 35 U.S.C. 154(b) by 0 days.

(21) Appl. No.: 14/716,367

(22) Filed: May 19, 2015

(51) Int. Cl.
*B23H 1/00* (2006.01)
*B23H 1/04* (2006.01)
*B23H 7/26* (2006.01)
*B23Q 3/155* (2006.01)

(52) U.S. Cl.
CPC .. *B23H 7/26* (2013.01); *B23H 1/00* (2013.01); *B23Q 3/155* (2013.01)

(58) Field of Classification Search
CPC .............. B23H 1/04; B23H 7/26; B23H 1/00; H05K 13/028; B23Q 3/155; B23Q 3/15506; B23Q 3/15513
See application file for complete search history.

(56) References Cited

U.S. PATENT DOCUMENTS

| | | | | | |
|---|---|---|---|---|---|
| 4,201,313 | A | * | 5/1980 | Kirsch | B65G 47/1407 221/200 |
| 4,419,807 | A | * | 12/1983 | Moulin | B23Q 3/15526 483/59 |
| 4,457,451 | A | * | 7/1984 | Ichikawa | B65G 47/1407 221/200 |
| 4,556,775 | A | * | 12/1985 | Inoue | B23K 11/0013 219/76.13 |
| 4,596,066 | A | * | 6/1986 | Inoue | B23H 1/04 219/69.15 |
| 4,633,053 | A | * | 12/1986 | Puthran | B23H 7/26 219/69.15 |
| 4,739,145 | A | * | 4/1988 | Check | B23H 1/00 219/69.15 |
| 5,364,329 | A | * | 11/1994 | Line | B23Q 3/15526 483/56 |
| 5,762,594 | A | * | 6/1998 | Hoppe | B23Q 3/155 483/56 |
| 6,203,249 | B1 | * | 3/2001 | Ishida | H01L 21/67721 221/203 |
| 6,740,839 | B1 | * | 5/2004 | Kung | B23H 1/00 219/69.11 |
| 6,791,054 | B1 | * | 9/2004 | Mertz | B23H 1/04 219/69.11 |
| 6,921,877 | B2 | * | 7/2005 | Lin | B23H 9/14 219/69.15 |
| 6,949,057 | B2 | * | 9/2005 | Everson | B23Q 3/15513 483/56 |
| 7,329,825 | B2 | * | 2/2008 | Awakura | B23H 7/265 219/69.15 |
| 2003/0102287 | A1 | * | 6/2003 | Katsumata | B23H 1/00 219/69.11 |
| 2013/0029817 | A1 | * | 1/2013 | Yellin | B23Q 3/15706 483/56 |
| 2013/0075370 | A1 | * | 3/2013 | Bigelow | B23H 1/00 219/69.15 |

FOREIGN PATENT DOCUMENTS

JP 62-162431 A * 7/1987
JP 8-290332 A * 11/1996

(Continued)

OTHER PUBLICATIONS

Machine translation of Japan Patent document No. 8-290,332, Oct. 2015.*
Machine translation of Japan Patent document No. 11-320,271, Oct. 2015.*

(Continued)

*Primary Examiner* — Geoffrey S Evans
(74) *Attorney, Agent, or Firm* — Warner Norcross and Judd LLP

(57) ABSTRACT

An electrical discharge machining (EDM) system including an automated electrode changer storing a plurality of electrodes for dispensing one at a time for insertion into the spindle of the system. The automated changer includes an electrode storage unit, an electrode insertion unit, and an electrode removal unit. The specification further discloses a method of electrical discharge machining utilizing, for example, the automated electrode changer.

11 Claims, 15 Drawing Sheets

(56) References Cited

FOREIGN PATENT DOCUMENTS

| | | | | |
|---|---|---|---|---|
| JP | 11-320271 | A | * | 11/1999 |
| JP | 2002-301623 | A | * | 10/2002 |
| JP | 2005-1026 | A | * | 1/2005 |
| JP | 2008-18499 | A | * | 1/2008 |

OTHER PUBLICATIONS

Machine translation of Japan Patent document No. 2005-1026, Oct. 2015.*
English translation of JP2008-18499, Feb. 2016.
English translation of JP2002-301623, Feb. 2016.

* cited by examiner

ELECTRICAL DISCHARGE MACHINING AUTOMATED ELECTRODE CHANGER

BACKGROUND OF THE INVENTION

The present invention relates to electrical discharge machining (EDM) systems and methods, and more particularly to systems and methods for the handling of electrodes within such systems and methods.

Electrical discharge machining (EDM), also referred to as spark machining, spark eroding, burning, die sinking, wire burning, or wire erosion, is a manufacturing process whereby a desired shape is obtained using electrical discharges. Material is removed from the workpiece by a series of rapidly recurring current discharges between two electrodes. One of the electrodes is the tool, or simply the electrode, and the other of the electrodes is the workpiece.

The electrode is consumed during the EDM process. Consequently, spent electrodes must be replaced regularly with new electrodes. Obviously, the EDM system is not operating while the electrodes are being replaced, resulting in downtime and reduced machine utilization. The amount of downtime during the electrode replacement depends in part on how quickly the operator notices the need for a replacement and in part on the skill and the speed of the operator in making the replacement. When the EDM machining requires a relatively high rate of electrode consumption (e.g. speed drilling), machine utilization is particularly low.

Techniques have been developed in an effort to automate the electrode replacement process. These techniques include carousels and spring-loaded cartridges. Unfortunately, these techniques require an operator to load the carousels and/or the cartridges, resulting in undesirable labor. Further, these techniques produce inconsistent results and therefore inconsistent machine utilization.

SUMMARY OF THE INVENTION

The aforementioned issues are addressed by the present invention in which an automated electrode changer is provided for an EDM system. The automated changer reduces electrode replacement time increasing machine utilization.

The automated electrode changer includes an electrode storage unit, an electrode insertion unit, and an electrode removal unit. The storage unit is designed to store a plurality of electrodes and to dispense the electrodes one at a time to the electrode insertion unit. The electrode removal unit removes spent electrodes from the spindle. The electrode insertion unit inserts new electrodes into the spindle.

The automated electrode changer is incorporated into an EDM system including a spindle and a spindle transport system adapted to selectively align the spindle with the electrode insertion system, the electrode removal unit, and a workpiece. The system with the automated electrode changer reduces operator involvement to (a) the periodic loading of a tube of electrodes and (b) the periodic exchanging of workpieces.

The invention also includes methods of EDM machining utilizing the automated electrode changer and its functionality.

The present invention provides a number of advantages. Firstly, the system reduces machine downtime. Secondly, the system reduces the risk of damage to the electrodes that may occur during manual handling. Thirdly, the system reduces the time required to replace an electrode by automating the process. Fourthly, the system reduces possible health risks to an operator in view of the reduce exposure to the EDM environment.

These and other advantages and features of the invention will be more fully understood and appreciated by reference to the description of the current embodiment and the drawings.

BRIEF DESCRIPTION OF THE DRAWINGS

FIG. 7A is an enlarged view of the area within the circle VIIA in FIG. 7.

FIG. 8A is an enlarged view of the area within the circle VIIIA in FIG. 8.

DESCRIPTION OF THE CURRENT EMBODIMENT

I. System

Figure 1:
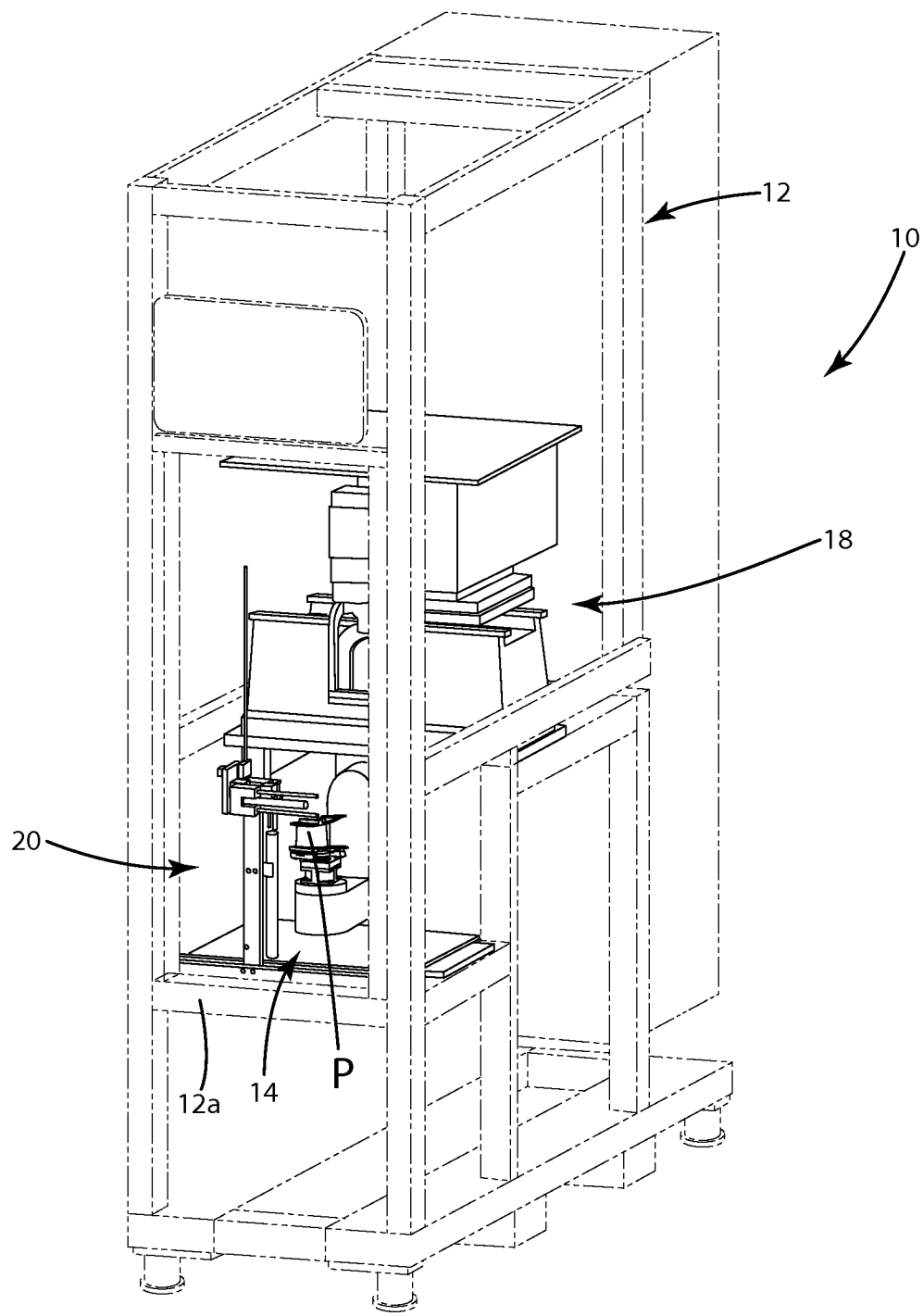
FIG. 1 is a perspective view of an EDM machine incorporating the automated electrode changer of the present invention.

An electrical discharge machining (EDM) machine constructed in accordance with a current embodiment of the invention is illustrated in the drawings and designated 10. The EDM machine 10 includes a frame 12, a workpiece support 14, a spindle 16, a spindle transport mechanism 18, and an automated electrode changer 20.

With the exception of the automated electrode changer 20, the components of the EDM machine 10 are well known to those skilled in the art and do not require detailed description. The frame 12 provides a support structure for the EDM machine 10. The workpiece holder 14 supports a workpiece P and moves about A and B axes. The spindle 16 releasably receives an electrode E. The spindle transport mechanism 18 moves the spindle 15 in the X, Y and Z directions. The spindle transport mechanism 18 is also known as an XYZ tool jig base. The workpiece holder 14 and the transport system 18 are operatively connected to a control system (not illustrated) of any type generally known to those skilled in the art.

The automated electrode changer 20 is one novel aspect of the present invention. As perhaps best illustrated in FIGS. 7, 7A, 8 and 8A, the changer 20 includes an electrode storage unit 22, an electrode insertion unit 24, and an electrode removal unit 26. The changer 20 includes a riser block 28 supported on a frame member 12a. The riser block 28 in turn supports, directly or indirectly, the remaining components of the changer 20.

A main block 30 is supported on the upper end of the riser block 28. The main block 30 supports the electrode storage unit 22, the electrode insertion unit 24, and the electrode removal unit 26.

Figure 2:
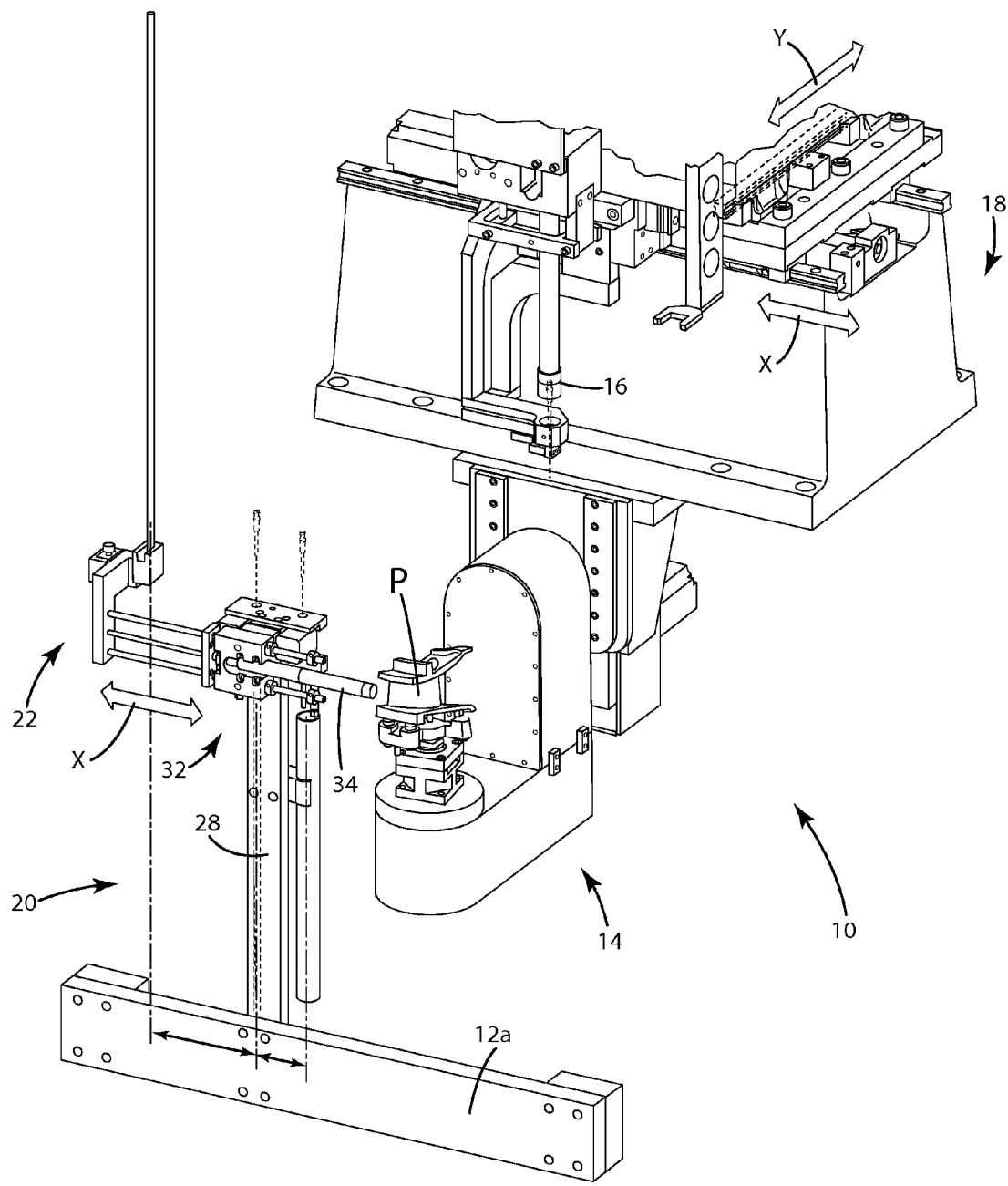
FIG. 2 is an enlarged perspective view of the EDM machine and the automated electrode changer.

The electrode storage unit 22 is supported on a slide assembly 32 for reciprocating linear movement in an X direction (see FIG. 2). The slide assembly 32 includes a slide cylinder 34 for moving the assembly. The slide assembly 32 enables the storage unit 22 to be transported between a rest position illustrated in FIG. 7 and a load position illustrated in FIG. 8.

The electrode storage unit 22 includes an electrode tube holder 36 a gate unit 38, and a vibrating motor 40. The holder 36 is adapted to receive an electrode tube 42 containing a plurality of electrodes E. As perhaps best illustrated in FIGS. 7A and 8A, the holder 36 defines a cylindrically shaped receiver bore 44. The floor 46 of the receiver bore 44 defines a hole 48 through which electrodes E can pass. The diameter of the hole 48 is selected to be larger than the diameter of any one of the electrodes E, but less than twice the diameter of any electrode. Consequently, the electrodes E must pass through the hole 48 one at a time.

In the current embodiment, the floor 46 slopes downwardly toward the hole 48. The vibrating motor 40 may be an eccentric drive motor or other suitable device for vibrating or shaking the electrode tube holder 36. The angle of the floor 46 and the vibration provided by the vibrating motor 40 assist in the movement of the electrodes E to the hole 48.

The gate unit 38 includes a slide 50 and a cylinder 52. In its normal position illustrated in FIG. 7A, the slide 50 extends into the hole 48 to prevent an electrode E from passing through the hole 48 beyond the gate 50. The cylinder 52 may be actuated to withdraw the gate 50 to the position illustrated in FIG. 8A, permitting an electrode E to exit the electrode tube 42 through the hole 48.

Figure 9:
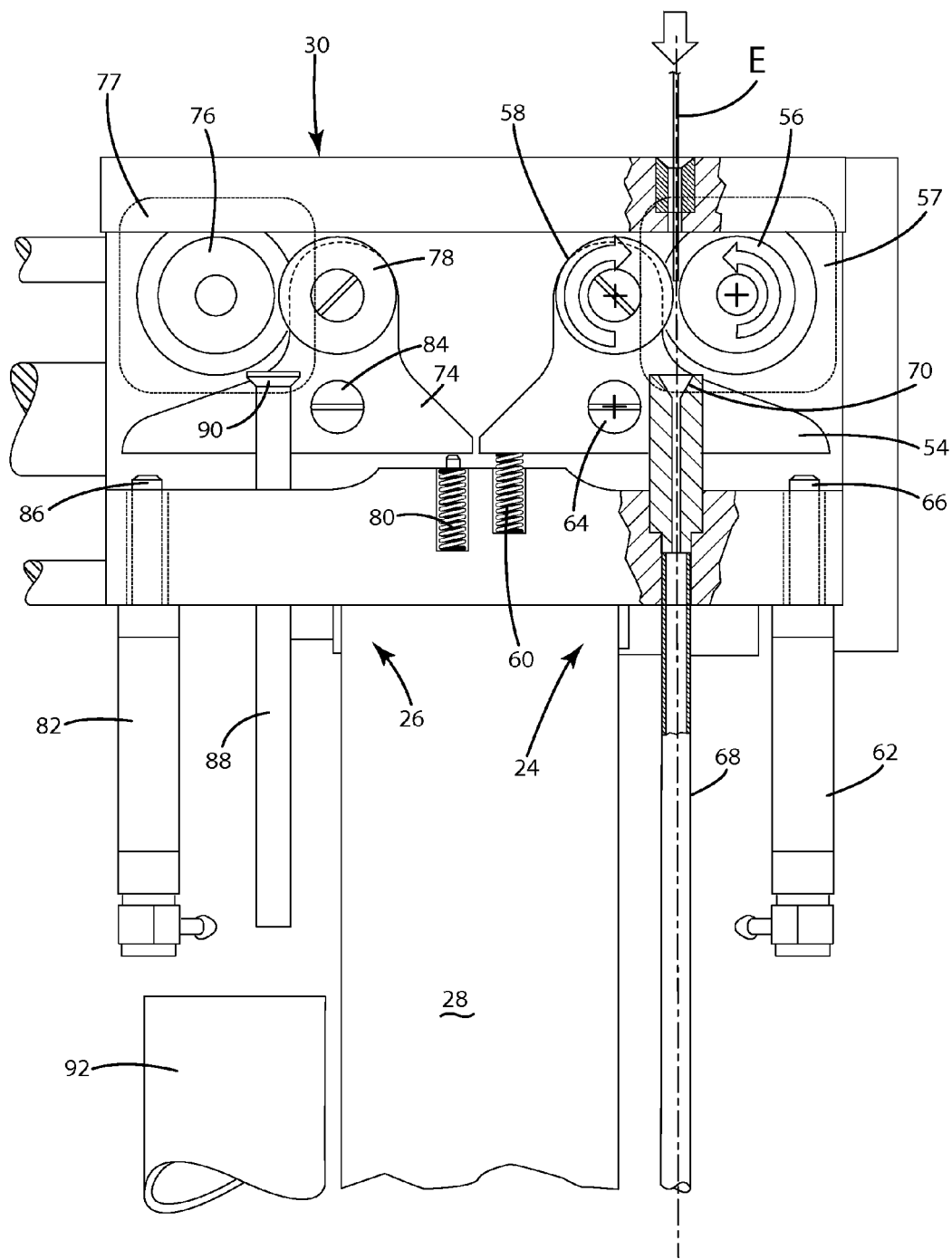
FIG. 9 is an enlarged rear elevational view of the changer showing a new electrode feeding into the electrode insertion unit.
Figure 10:
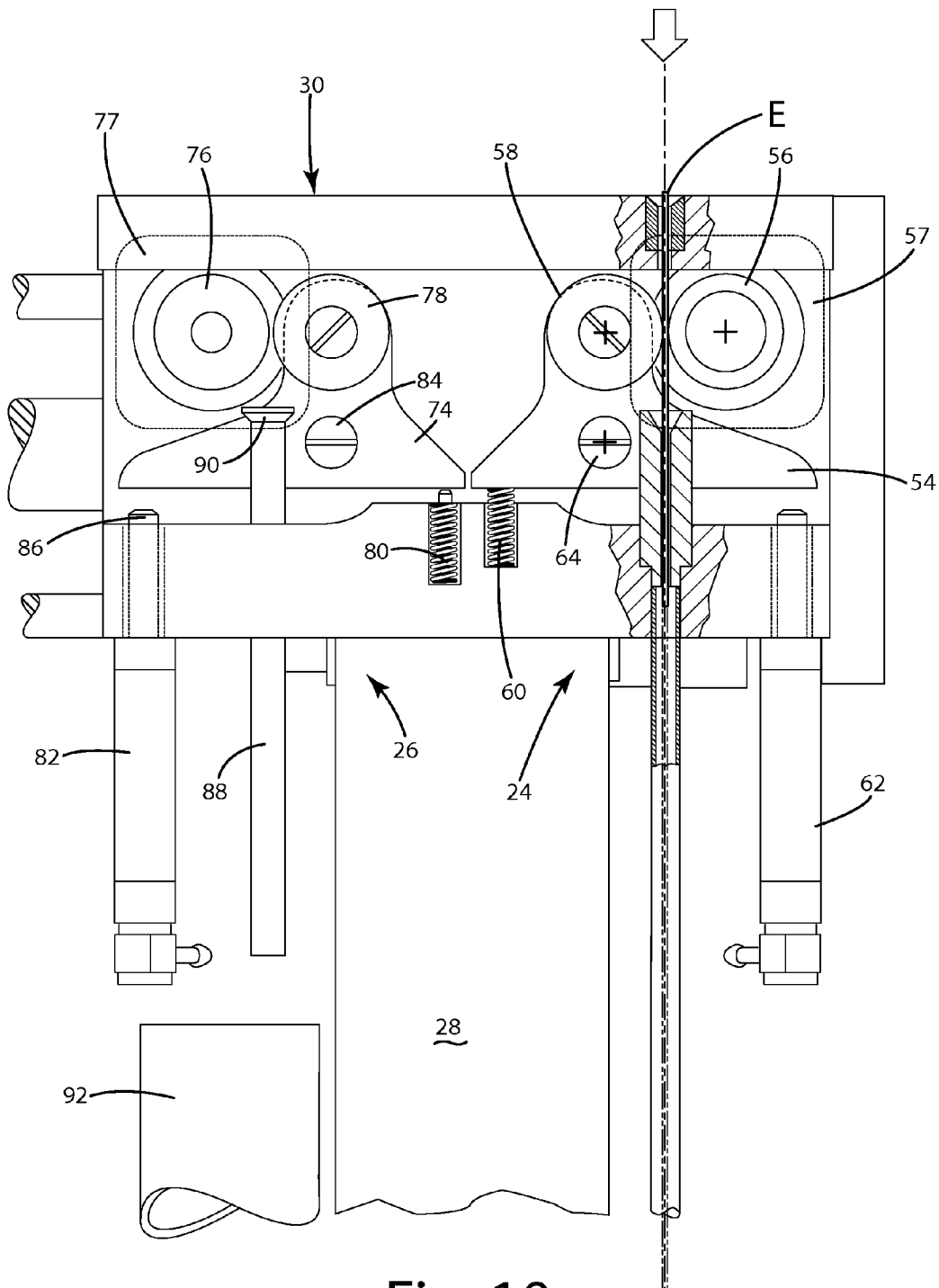
FIG. 10 is an enlarged rear elevational view of the changer showing the new electrode fully inserted into the electrode insertion unit.

The electrode insertion unit 24 is perhaps best illustrated in FIGS. 9-10. The electrode insertion unit 24 includes a roller mount 54, a pair of rollers 56, 58, a spring 60, and a cylinder 62. The roller 56 is supported by the main block 30 and is selectively rotated by a motor 57. The idler roller 58 is rotatably supported on the roller mount 54, which in turn is pivotably supported on pivot 64. The spring 60 biases the roller mount 54 in a clockwise direction as viewed in FIGS. 9-10 to move the roller wheel 58 into contact with roller wheel 56. Cylinder 62 may be actuated so that its plunger 66 pivots the roller mount 54 in a counterclockwise direction as viewed in FIGS. 9-10 to disengage the roller 58 from the roller 56.

The electrode receiver tube 68 and the electrode receiver guide 70 are supported within the load guide mount 31. The tube 68 and the guide 70 are aligned with the rollers 56, 58 to receive an electrode E.

The electrode removal unit 26 also is perhaps best illustrated in FIGS. 9-10. The electrode removal unit 24 includes a roller mount 74, a pair of rollers 76, 78, a spring 80, and a cylinder 82. The roller 76 is supported by the main block 30 and is selectively rotated by a motor 77. The idler roller 78 is rotatably supported on the roller mount 74, which in turn is pivotably supported on pivot 84. The spring 60 biases the roller mount 54 in a counterclockwise direction as viewed in FIGS. 9-10 to bias the roller wheel 78 into contact with roller wheel 76. The cylinder 62 may be actuated so that its plunger 86 pivots the roller mount 74 in a clockwise direction as viewed in FIG. 9 to disengage the roller 78 from the roller 76.

The electrode removal tube 88 and the electrode removal guide 90 are supported within the load guide mount 31. The tube 88 and the guide 90 are aligned with the rollers 76, 78 to receive an electrode E from the spindle 16. A spent electrode tube 92 is supported on the riser block 28 by the tube holder 94. The spent electrode tube 92 is aligned with the spent tube guide 88 to receive the spent electrodes for subsequent disposal or recycling.

A control system (not illustrated) is operatively connected to all of the described components to control their operation. The design and implementation of the control system will be readily apparent to those skilled in the art based on this specification. It therefore is unnecessary to describe the control system in detail.

II. Operation

An exemplary method of operation of the EDM system 10 will now be described. Other methods and/or reordering of steps within methods will be apparent to those skilled in the art.

While the description of the operation could begin at a number of steps, this description will begin with the loading of the electrode storage tube or cartridge 42 into the tube holder 36. This loading is performed by an operator, who then takes further action to indicate that the electrode tube 42 has been loaded. Such further action may be as simple as shutting a door on the machine 10. Such action may alternatively be entry on a keyboard or other input device.

With the electrode tube 42 loaded, the EDM machine 10 performs EDM machining until the control system determines that the electrode E within the spindle 16 is spent and requires replacement or until the program is complete. If the electrode E requires replacement, then the control system initiates an electrode change.

Figure 3:
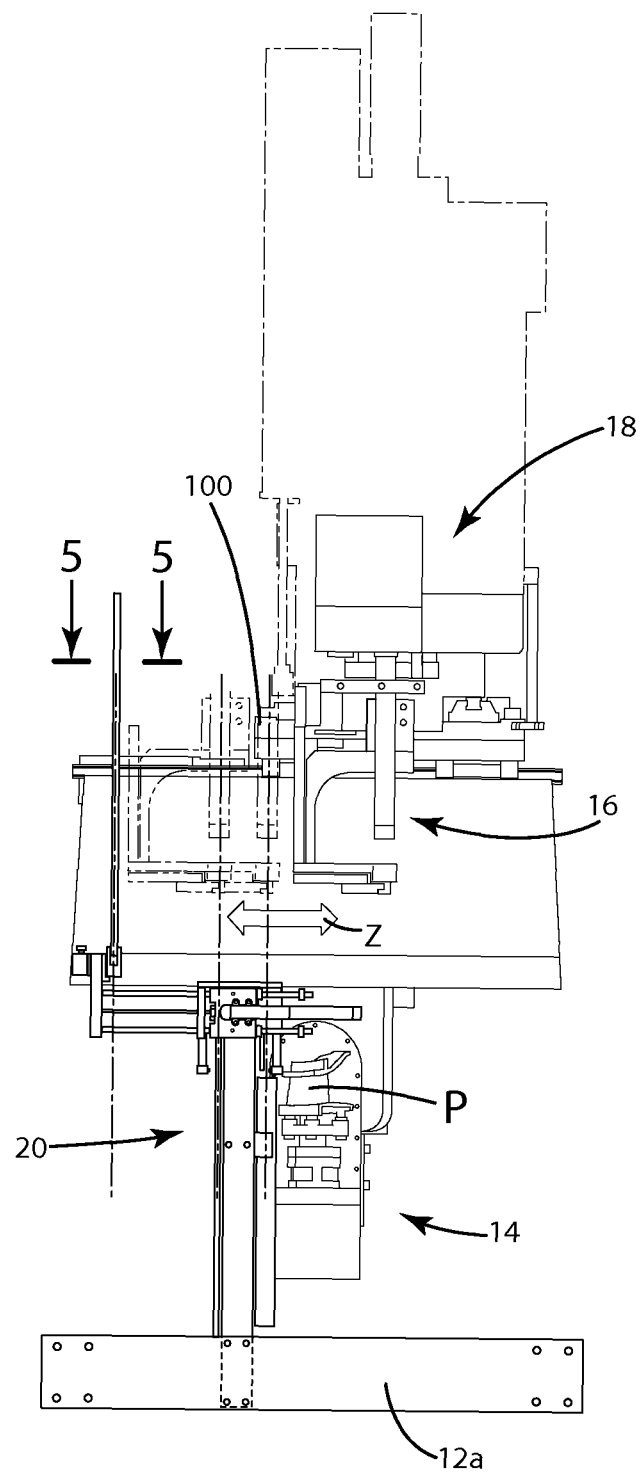
FIG. 3 is a front elevational view of the EDM machine and the automated electrode changer.
Figure 4:
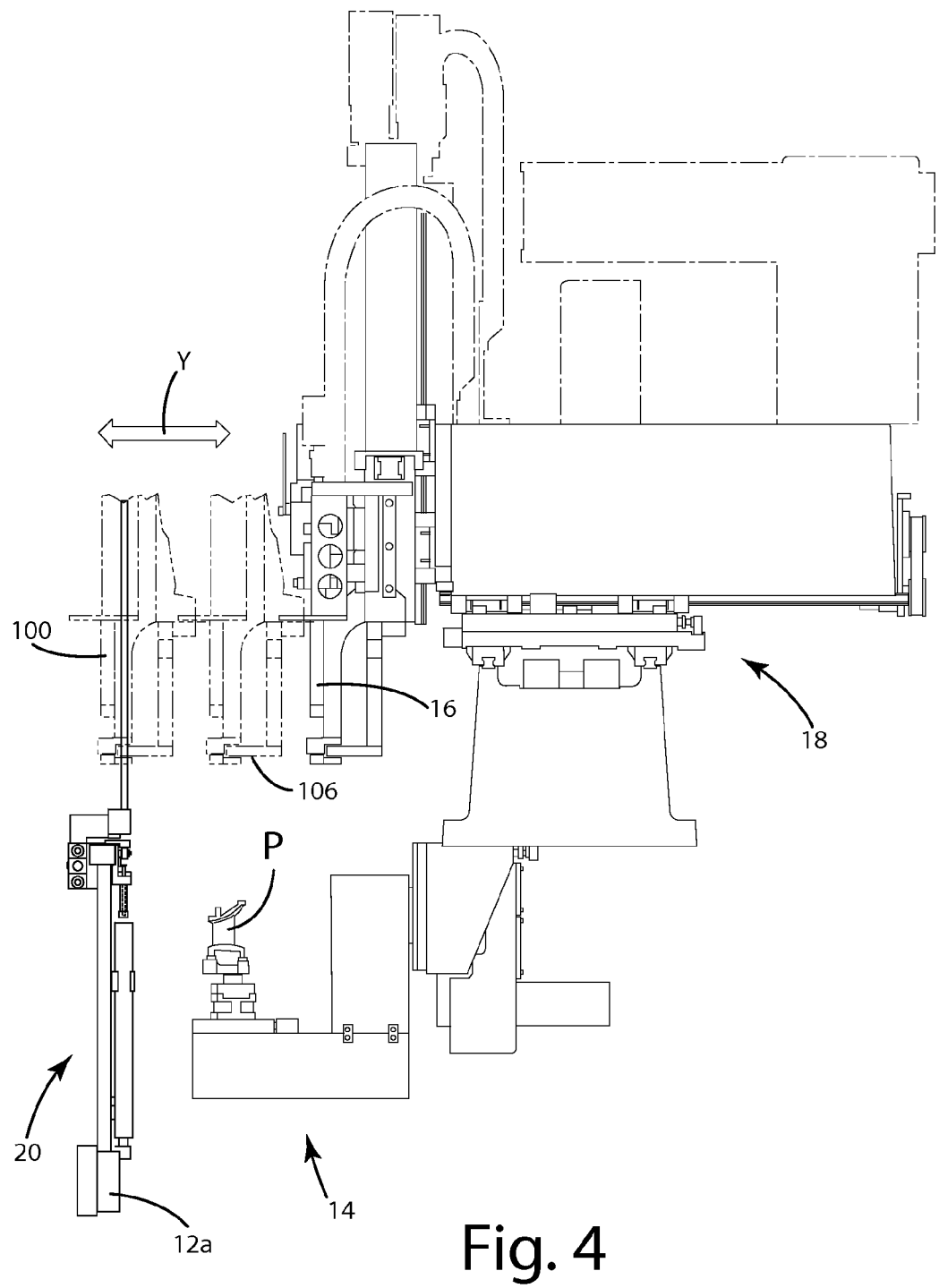
FIG. 4 is a right side elevational view of the EDM machine showing the spindle in several positions.
Figure 5:
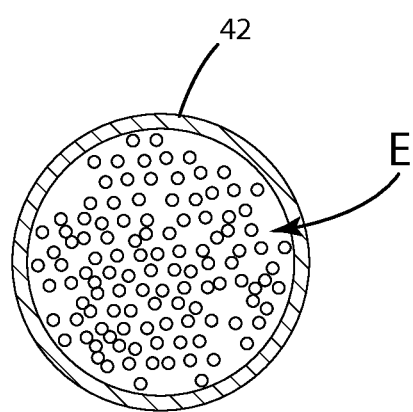
FIG. 5 is a sectional view of the electrode storage tube taken along line 5-5 in FIG. 3.
Figure 6:
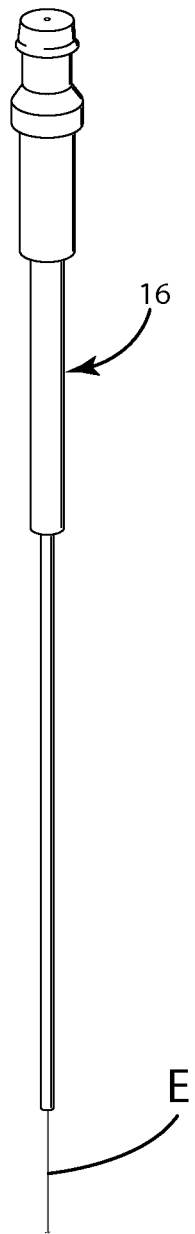
FIG. 6 is a perspective view of a guide and an electrode.
Figure 7:
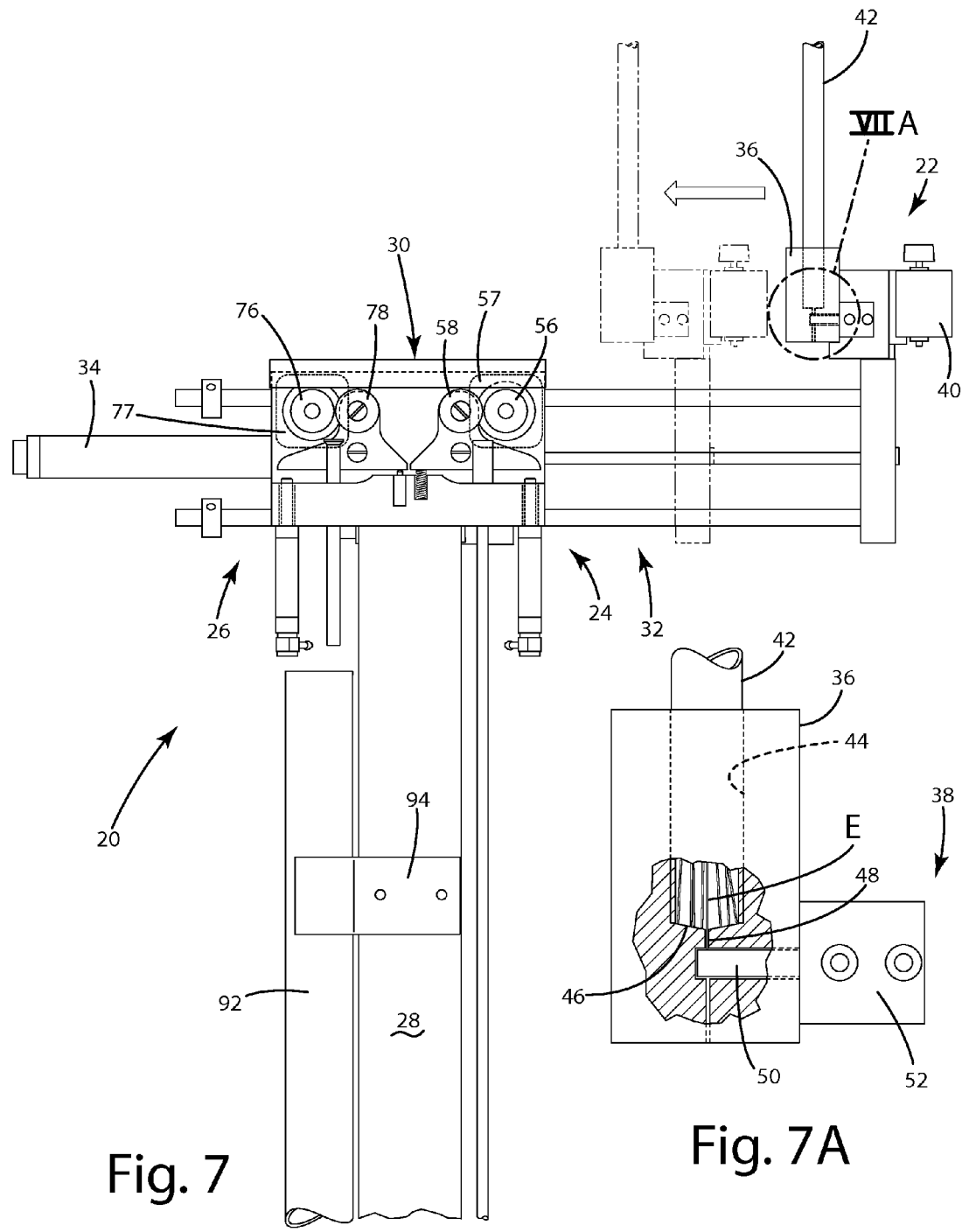
FIG. 7 is a rear elevational view of the changer showing the electrode storage unit moving toward the electrode insertion unit.
Figure 11:
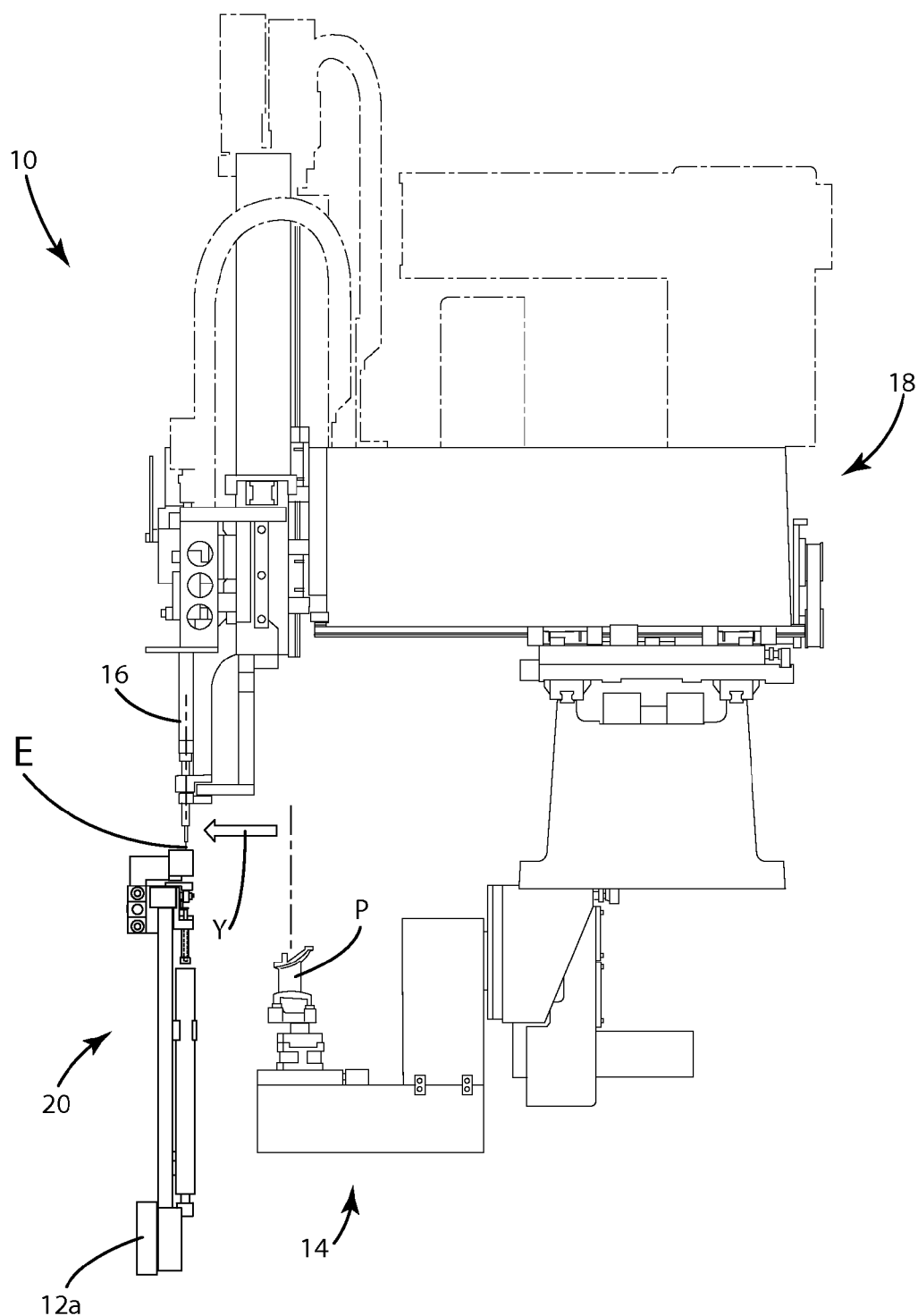
FIG. 11 is a right side elevational view of the EDM machine showing the spindle aligned with the electrode removal unit.

The electrode change sequence begins by transporting the spindle 16 into alignment with the electrode removal unit 26. This position is identified by the numeral 100 in FIGS. 3-4. The position is further illustrated in FIGS. 11-12. The spindle 16 is unclamped to release the spent electrode, which drops by way of gravity between the open rollers 76, 78.

Figure 12:
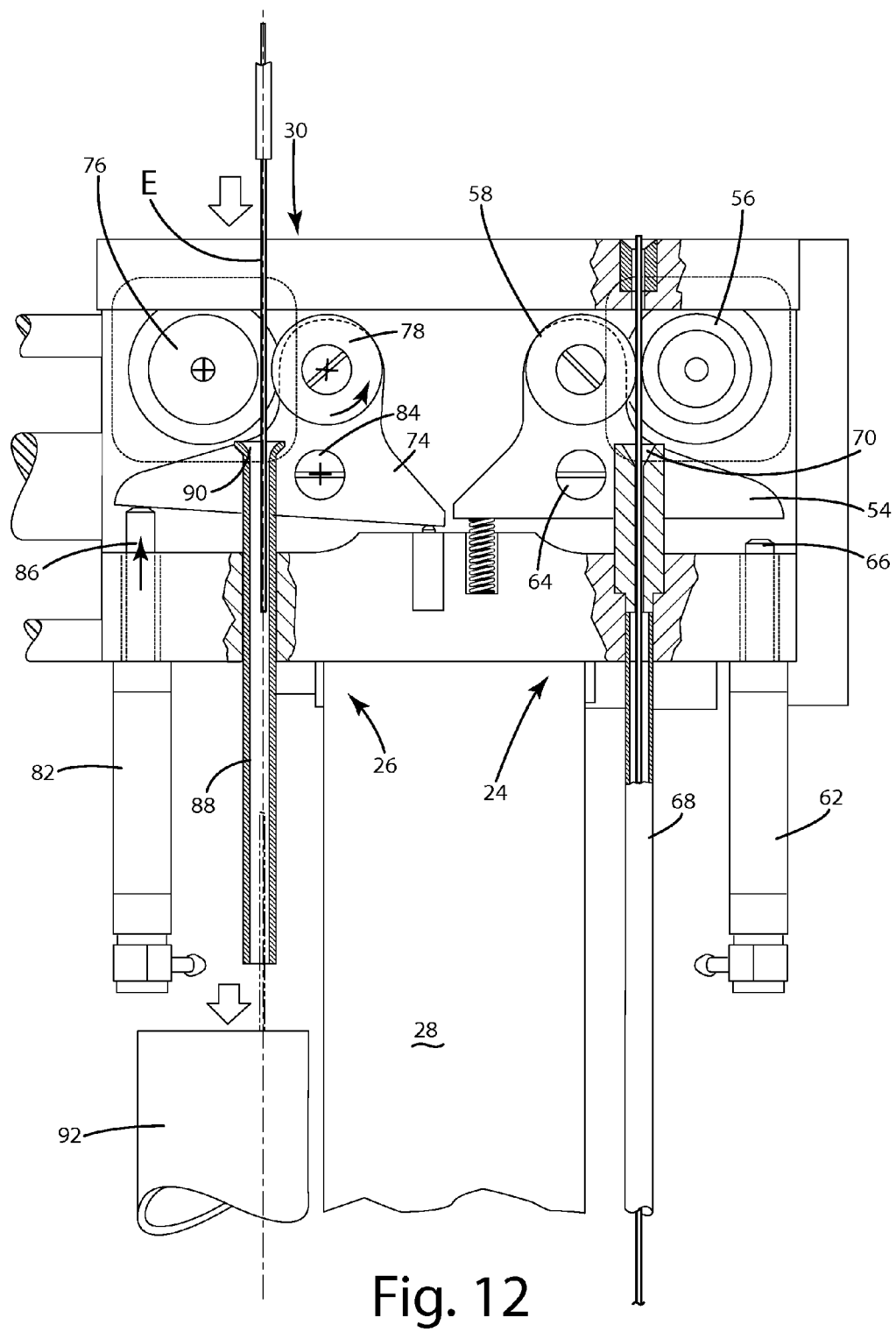
FIG. 12 is an enlarged rear elevational view of the changer showing the spent electrode being removed from the spindle.

The control system then actuates the cylinder 82 to allow the roller mount 74 to pivot in a counterclockwise direction as viewed in FIG. 12. This movement allows the roller 78 to engage the adjacent roller 76 and to pinch or capture the electrode E. The roller 76, 78 are then rotated to remove the electrode from the spindle 16. The electrode E travels through the guide tube 88 into the spent electrode tube 92.

Figure 13:
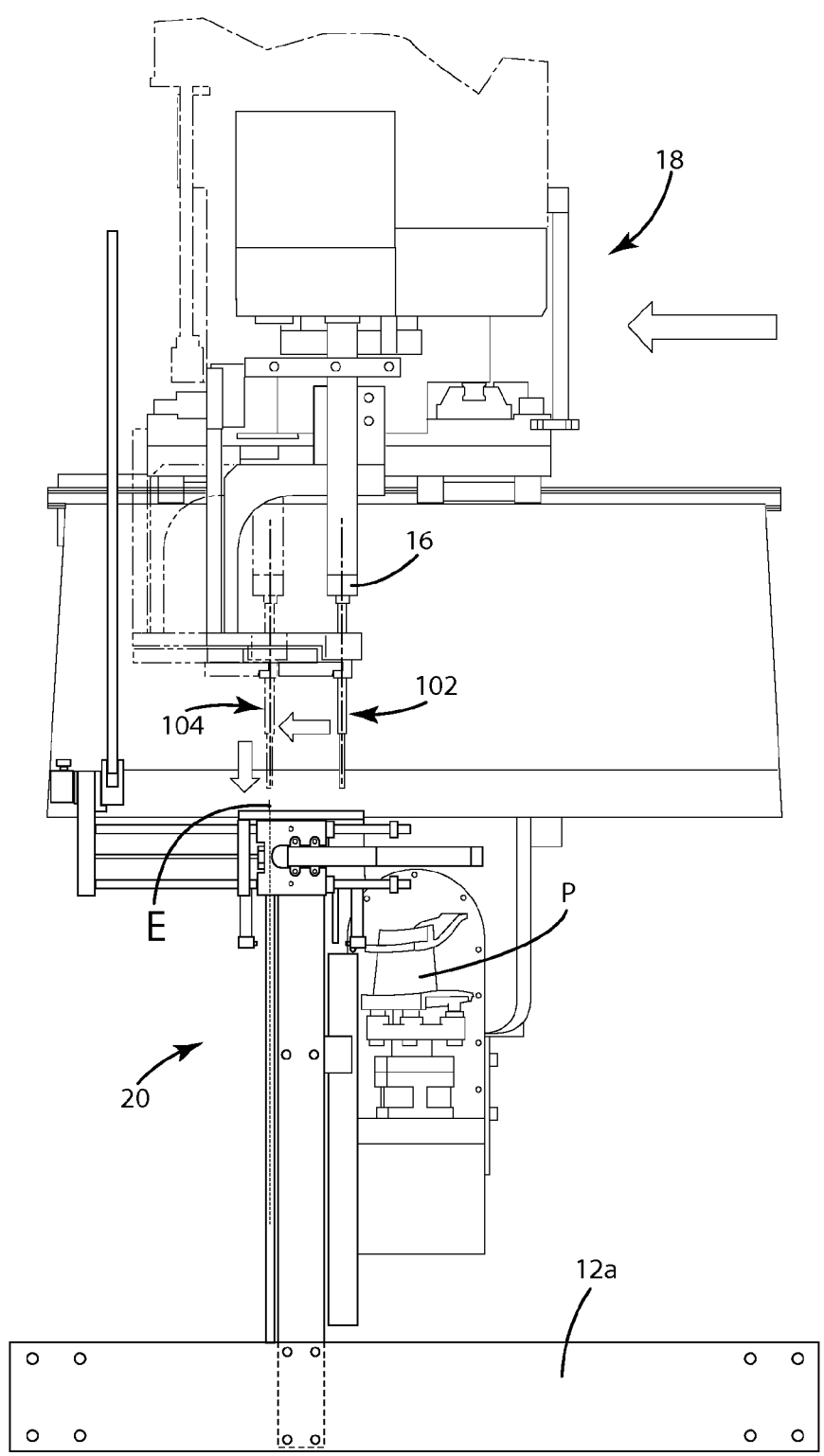
FIG. 13 is a front elevational view of the EDM machine moving the spindle between alignment with the electrode removal unit and the electrode insertion unit.
Figure 14:
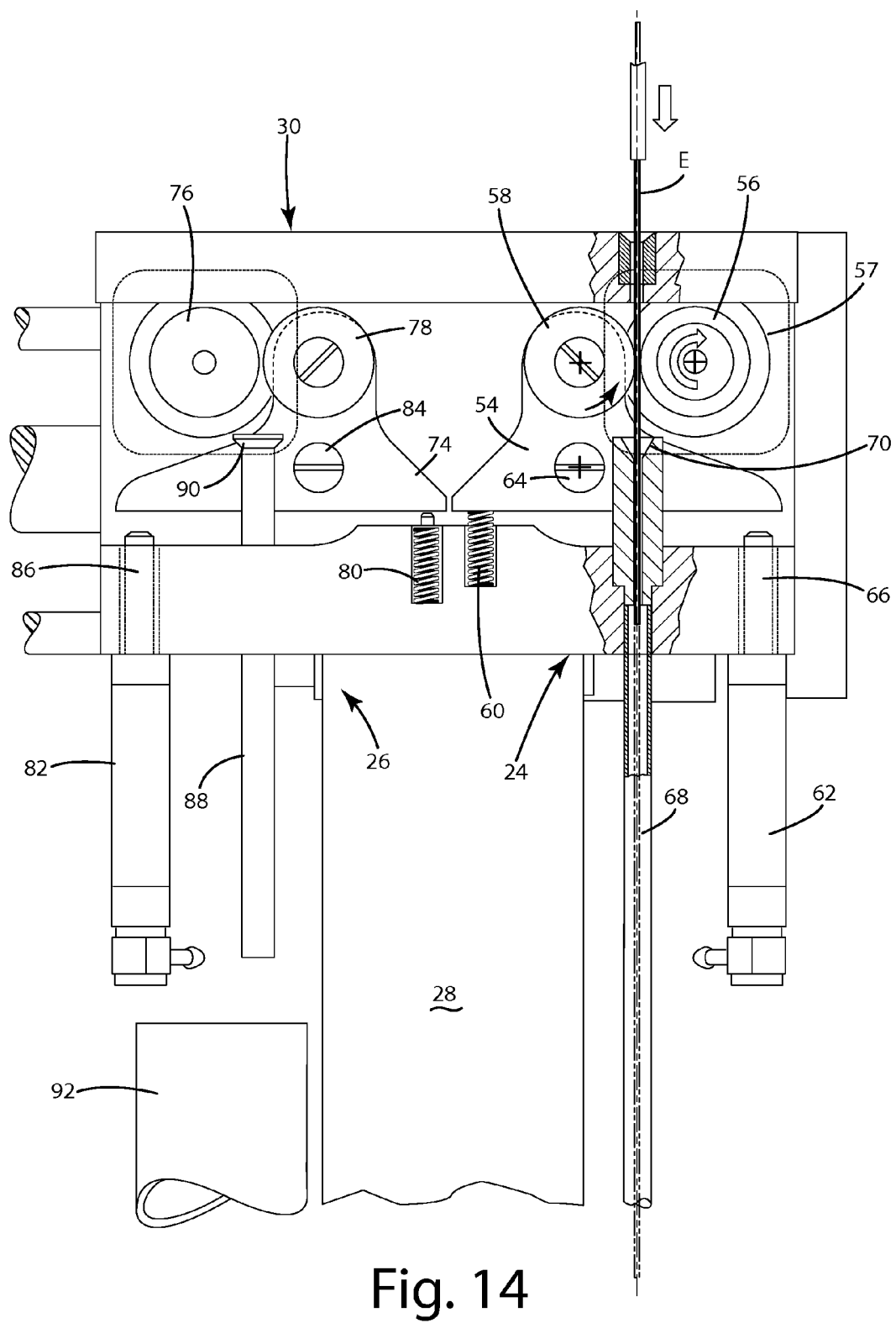
FIG. 14 is an enlarged rear elevational view of the changer showing the new electrode being inserted into the spindle.
Figure 15:
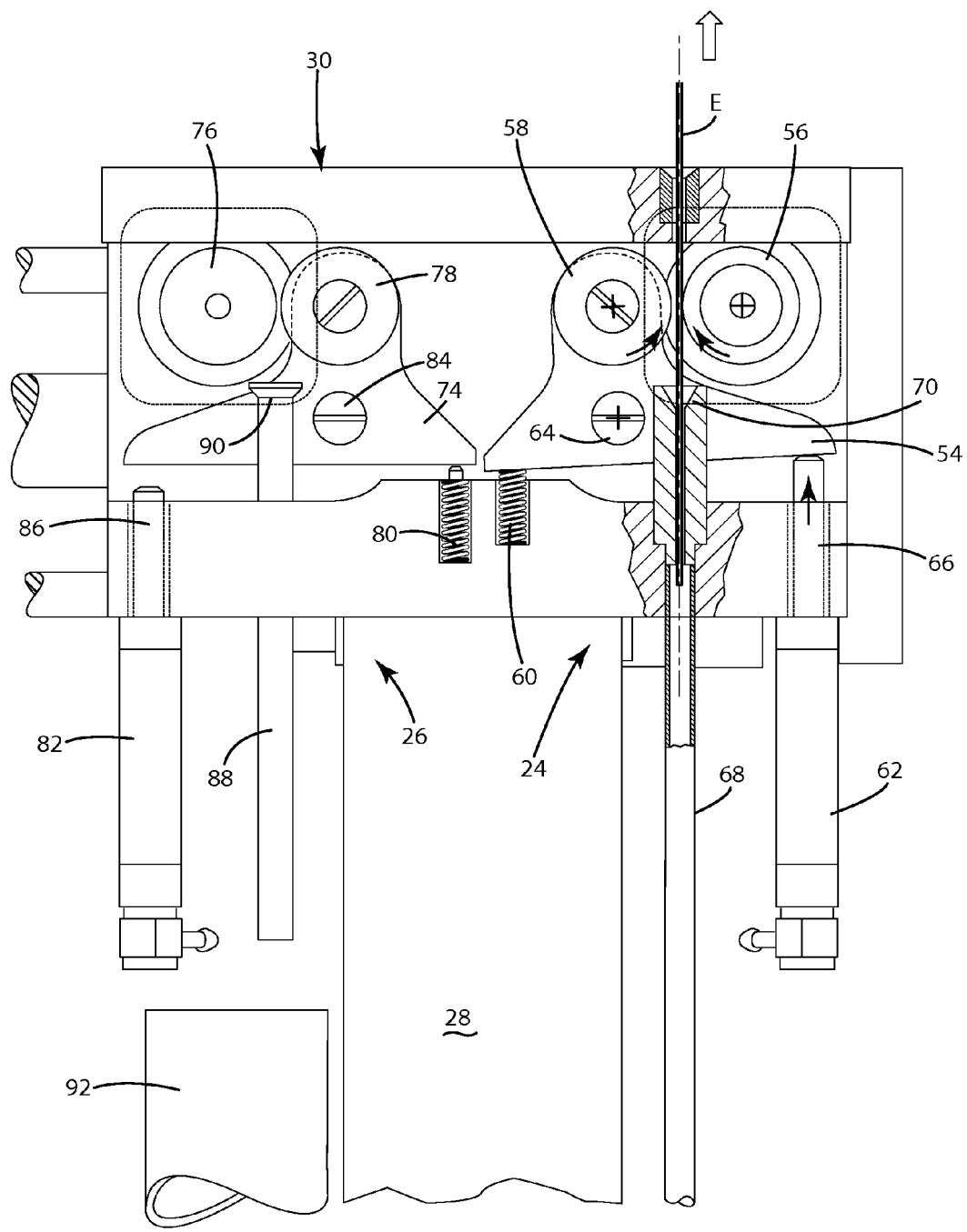
FIG. 15 is an enlarged rear elevational view of the changer releasing the new electrode.

The spindle 16 is then raised to position 102 (see FIG. 13), and then the spindle 16 is moved in a transverse direction to the position 104 (see again FIG. 13) in which the spindle is aligned with the rollers 56, 58 of the electrode insertion unit 24. The spindle is then lowered to a position closely proximate the spindle insertion unit 24.

The rollers 56, 58 are then rotated to transport a previously staged electrode E (as described below) upwardly through the guide tube 68 and into the spindle 16.

The spindle 16 is then actuated to clamp the electrode inserted therein.

The control system then actuates cylinder 62 to extend the plunger 66, thereby pivoting the roller mount 54 in a counterclockwise direction as viewed in FIG. 12. This pivoting disengages the roller 58 from the adjacent roller 56 to release the electrode E.

Figure 16:
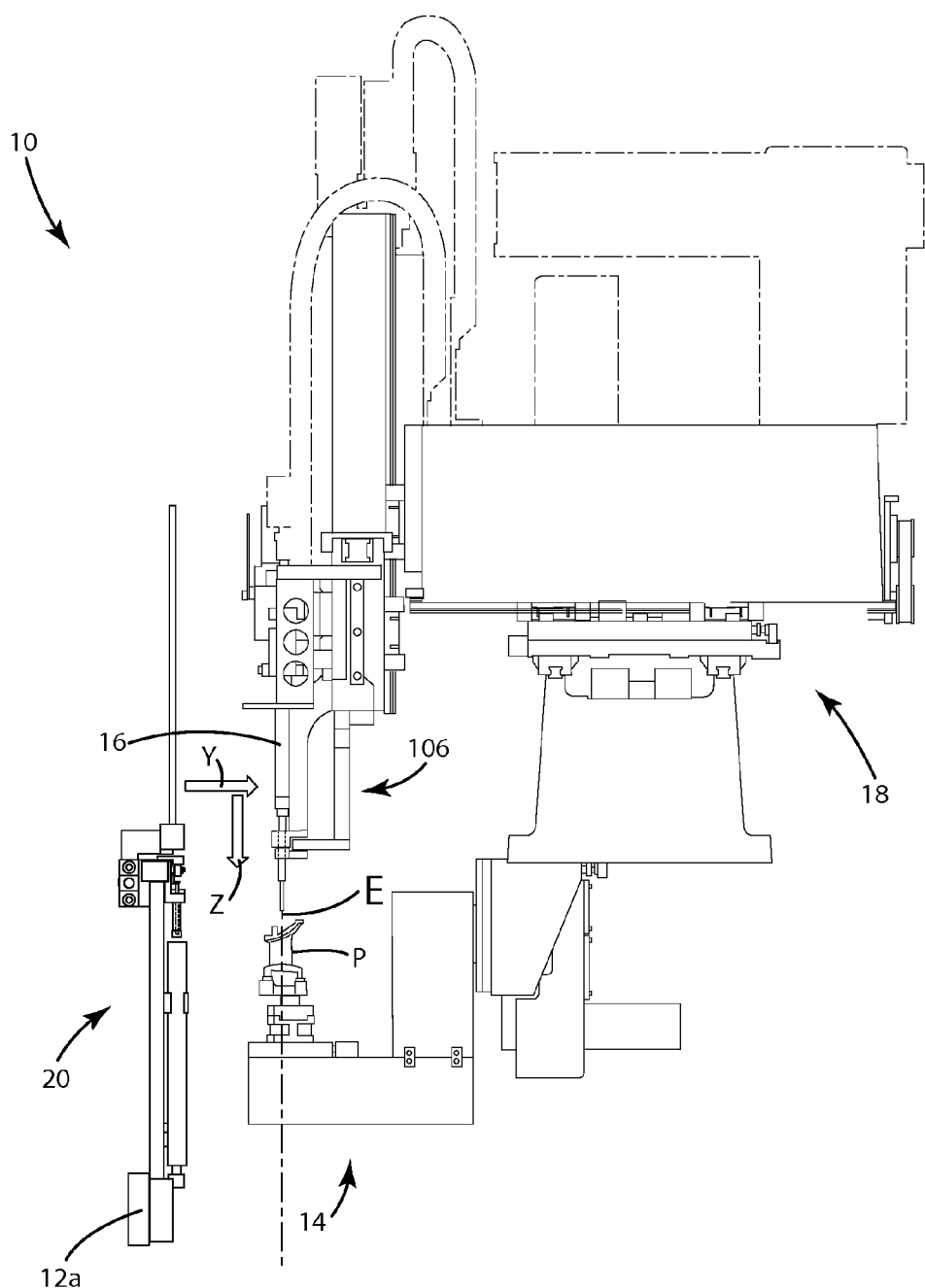
FIG. 16 is a right side elevational view of the EDM machine showing the spindle realigned with the workpiece.

The spindle 16 then is transported upwardly to completely withdraw the electrode E from the electrode insertion unit 24. The spindle 16 is then transported back to its operating position 106 illustrated in FIGS. 2, 4 and 16. The machine 10 then resumes EDM machining until the workpiece P is completed or until another electrode change is required.

Figure 8:
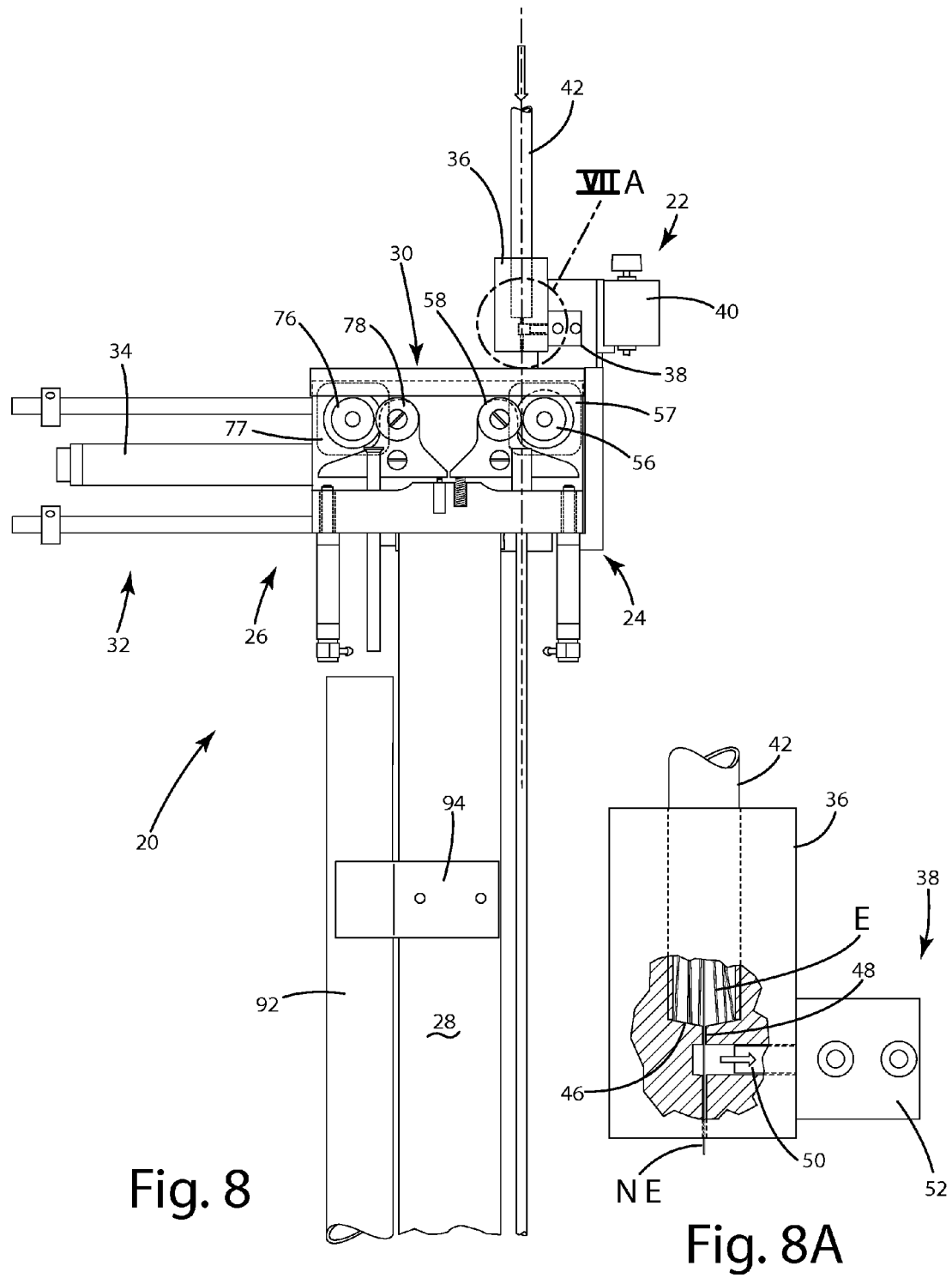
FIG. 8 is a rear elevational view of the changer showing the electrode storage unit aligned with the electrode insertion unit.

While the machine 10 resumes EDM machining after the electrode replacement, another electrode is staged within the electrode insertion unit 24. This process begins by actuating the slide cylinder 34 to move the electrode storage unit 22 from its normal position illustrated in FIGS. 2 and 7 to a position aligned with the electrode insertion unit 24 as illustrated in FIG. 8. When in position, the cylinder 62 is actuated to withdraw the plunger 66, which permits the roller mount 54 to pivot counterclockwise as viewed in FIG. 9. This motion enables the roller 58 to engage the adjacent roller 56 and to trap or pinch the electrode E. The cylinder 52 in the gate unit 38 is actuated to withdraw the gate 50 to the position illustrated in FIG. 8A. Additionally, the vibrating motor 40 is actuated. The combination of the sloped floor 46 and the vibrating motor 40 causes one of the electrodes E within the tube 42 to become aligned with, and to fall through, the hole 48 and between the rollers 56, 58 as illustrated in FIG. 9. The rollers 56, 58 are then rotated to draw the electrode E downwardly through the guide tube 68 until the leading end of the electrode is sensed by sensor (not illustrated). At that time, the rollers 56, 58 are stopped; the cylinder 52 on the gate unit 38 is actuated to return the slide 50 to its position illustrated in FIG. 7A; and the vibrating motor 40 is turned off. The rollers 56, 58 are then rotated once again to draw the electrode E fully downwardly into the insertion unit 24. At this point, none or relatively little of the electrode E extends upwardly above the electrode insertion unit 24. The slide cylinder 34 is then actuated to return the electrode storage unit 22 to its normal position. At this point, the electrode E within the guide tube 68 is staged for a subsequent electrode change as described above.

As will be appreciated from this specification, the present invention essentially fully automates the electrode changing function within an EDM environment. Essentially the only operator involvement required is (a) the periodic loading of the electrode tube 42, (b) the periodic exchange of workpieces P, and (c) the periodic removal of spent electrodes from the spent electrode tube 92. The present invention thereby accelerates electrode changes and increases machine utilization.

III. Conclusion

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein. Also, the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The embodiments of the invention in which an exclusive property or privilege is claimed are defined as follows:

1. An electrical discharge machining (EDM) system comprising:
   a spindle adapted to receive an electrode in an upward direction;
   an electrode storage system adapted to store a plurality of electrodes, the electrode storage system including an electrode dispensing system adapted to dispense the electrodes one at a time from the electrode storage system;
   an electrode insertion system adapted to draw an electrode from the electrode dispensing system in a downward direction and to insert the electrode in an upward direction directly into contact with the spindle;
   a storage transport system adapted to move the electrode storage system horizontally between a dispensing position vertically aligned with the electrode insertion system and a rest position;
   an electrode removal system adapted to remove a used electrode from the spindle in a downward direction; and a spindle transport system adapted to move the spindle horizontally to selectively align the spindle with (a) the electrode removal system for withdrawal of a spent electrode from the spindle in a downward direction by the electrode removal system, (b) the electrode insertion system for the insertion of an electrode into the spindle in an upward direction by the electrode insertion system, and (c) a workpiece.

2. An EDM system as defined in claim 1 further comprising:
a control system operatively connected to the electrode storage system, the electrode insertion system, the storage transport system, the electrode removal system, and the spindle transport system.

3. An EDM system as defined in claim 1 wherein the electrode insertion system includes a pair of rollers adapted to grasp and to transport an electrode (a) in a downward direction when the electrode insertion system is withdrawing an electrode from the electrode storage system and (b) in an upward direction when the electrode insertion system is inserting an electrode into the spindle.

4. An electrical discharge machining (EDM) system comprising:
a spindle adapted to receive an electrode;
an electrode storage system adapted to store a plurality of electrodes, the electrode storage system including an electrode dispensing system adapted to dispense the electrodes one at a time from the electrode storage system;
an electrode insertion system adapted to receive an electrode from the electrode dispensing system and to insert the electrode into the spindle;
an electrode removal system adapted to remove a used electrode from the spindle, the electrode removal system including a pair of rollers adapted to grasp and to transport an electrode; and
a spindle transport system adapted to selectively align the spindle with the electrode insertion system, the electrode removal system, and a workpiece.

5. An automated electrode changer for an electrical discharge machining (EDM) system, the changer comprising:
an electrode storage system adapted to store a plurality of electrodes, the electrode storage system including an electrode dispensing system adapted to dispense the electrodes one at a time from the electrode storage system;
an electrode insertion system adapted to draw an electrode from the electrode dispensing system in a downward direction and to insert the electrode in an upward direction directly into contact with a spindle;
a storage transport system adapted to move the electrode storage system horizontally between a dispensing position vertically aligned with the electrode insertion system and a rest position; and
an electrode removal system adapted to remove a used electrode from a spindle in a downward direction.

6. An automated electrode changer as defined in claim 5 further comprising:
a control system operatively connected to the electrode storage system, the electrode insertion system, the storage transport system, and the electrode removal system.

7. An automated electrode changer as defined in claim 5 wherein the electrode insertion system includes a pair of rollers adapted to grasp and to transport an electrode (a) in a downward direction when the electrode insertion system is withdrawing an electrode from the electrode storage system and (b) in an upward direction when the electrode insertion system is inserting an electrode into a spindle.

8. An automated electrode changer for an electrical discharge machining (EDM) system comprising:
an electrode storage system adapted to store a plurality of electrodes, the electrode storage system including an electrode dispensing system adapted to dispense the electrodes one at a time from the electrode storage system;
an electrode insertion system adapted to receive an electrode from the electrode dispensing system and to insert the electrode into a spindle; and
an electrode removal system adapted to remove a used electrode from a spindle, the electrode removal system including a pair of rollers adapted to grasp and to transport an electrode.

9. A method of electrical discharge machining comprising the steps of:
loading a plurality of electrodes into an electrode storage system;
vertically aligning the electrode storage system with an electrode insertion system;
dispensing one of the electrodes from the electrode storage system in a downward direction;
drawing the electrode downwardly from the electrode storage system into the electrode insertion system;
moving the electrode dispensing system horizontally out of vertical alignment with the electrode insertion system;
vertically aligning the spindle with the electrode in the electrode insertion system;
actuating the electrode insertion system to insert the electrode in an upward direction directly into contact with the spindle;
machining a workpiece thereby creating a used electrode;
vertically aligning the spindle with an electrode removing system;
actuating the electrode removal system to draw the used electrode from the spindle in a downward direction; and
repeating the above steps following the loading step.

10. A method as defined in claim 9 wherein the electrode insertion system actuating step includes rotating a pair of rollers to grasp and to transport the electrode.

11. A method of electrical discharge machining comprising the steps of:
loading a plurality of electrodes into an electrode storage system;
dispensing one of the electrodes from the electrode storage system into an electrode insertion system;
aligning the spindle with the electrode in the electrode insertion system;
actuating the electrode insertion system to insert the electrode into the spindle;
machining a workpiece thereby creating a used electrode;
aligning the spindle with an electrode removing system;
actuating the electrode removal system to remove the used electrode from the spindle, the electrode removal system actuating step including rotating a pair of rollers to grasp and to transport the electrode; and
repeating the above steps following the loading step.

* * * * *